US012801402B2

(12) United States Patent
Acharya et al.

(10) Patent No.: US 12,801,402 B2
(45) Date of Patent: Nov. 17, 2026

(54) SYSTEM CONFIGURATION USING ROBOTIC PROCESS AUTOMATION

(71) Applicant: SAP SE, Walldorf (DE)

(72) Inventors: Win Acharya, Bengaluru (IN); Seshadri Sreenivas Ramanarayanan, Walldorf (DE)

(73) Assignee: SAP SE, Walldorf (DE)

( * ) Notice: Subject to any disclaimer, the term of this patent is extended or adjusted under 35 U.S.C. 154(b) by 766 days.

(21) Appl. No.: 18/162,893

(22) Filed: Feb. 1, 2023

(65) Prior Publication Data

US 2024/0256291 A1 Aug. 1, 2024

(51) Int. Cl.
*G06F 9/445* (2018.01)

(52) U.S. Cl.
CPC ................................ *G06F 9/44505* (2013.01)

(58) Field of Classification Search
CPC .................................................. G06F 9/44505
USPC .......................................................... 718/102
See application file for complete search history.

(56) References Cited

U.S. PATENT DOCUMENTS

2020/0097389 A1* 3/2020 Smith ................. G06F 11/0793
2021/0072969 A1* 3/2021 Mei ........................... G06F 8/38
2022/0197306 A1* 6/2022 Cella ...................... G06N 20/00
2022/0327351 A1* 10/2022 Barello .............. G06Q 10/0633
2024/0256370 A1* 8/2024 Vlad .................. G05B 19/4155

OTHER PUBLICATIONS

Chirkin, Artem & Belloum, A. & Kovalchuk, Sergey & Makkes, Marc & Melnik, Michael & Visheratin, Alexander & Nasonov, Denis. (2017). Execution time estimation for workflow scheduling. Future Generation Computer Systems. 75. 10.1016/j.future.2017.01.011. (Year: 2017).*

Memgraph, Using In-Memory Databases in Data Science, Jun. 8, 2022, https://memgraph.com/blog/using-in-memory-databases-in-data-science (Year: 2022).*

* cited by examiner

*Primary Examiner* — April Y Blair
(74) *Attorney, Agent, or Firm* — Fountainhead Law Group, PC

(57) ABSTRACT

Embodiments relate to methods and systems that utilize Robotic Process Automation (RPA) to perform configuration and setup of application(s) that may be present within larger, complex landscapes. In response to a configuration request, content is imported from the application(s)—e.g., read from documentation of a content package. Configuration data is derived from the content, and the configuration data is stored. RPA bot(s) are created to interact with the application(s) and perform a configuration according to a sequence of steps. The configuration is tested according to an end-to-end test path, with the status of the configuration ultimately being reported back to the requestor. Certain embodiments may employ self-healing to correct issues revealed by the testing. Particular embodiments may utilize Natural Language Processing (NLP) and/or predictive Machine Learning (ML) in order to perform one or more of the import, configuration, test, and/or (optional) self-healing functions.

20 Claims, 8 Drawing Sheets

SYSTEM CONFIGURATION USING ROBOTIC PROCESS AUTOMATION

BACKGROUND

Unless otherwise indicated herein, the approaches described in this section are not prior art to the claims in this application and are not admitted to be prior art by inclusion in this section.

External vendors may provide an entity with infrastructure to handle processes such as invoice generation and billing. The entity, however, may seek to further customize and extend its infrastructure in order to be tailored to address entity-specific needs.

Such customization efforts can, however, be expensive and time-consuming. In particular, these activities can demand effort and expertise extending across multiple applications of different types (e.g., accounting; analytics) involving a variety of roles (e.g., ordinary users; administrators; process experts; citizen developers). Moreover, coordinating effort for tasks such as troubleshooting under these circumstances, can prove complex, difficult, and prone to error.

SUMMARY

Embodiments relate to methods and systems that utilize Robotic Process Automation (RPA) to perform configuration and setup of application(s) that may be present within larger, complex landscapes. In response to a configuration request, content relevant to setting up an application is imported—e.g., read from documentation of a content package. The configuration data is then derived from the imported content, including a series of steps that may be performed to create a configuration for the application. The configuration data is stored, and RPA bot(s) are created to interact with the application(s) and perform the sequence of steps.

The configuration is tested according to an end-to-end test path, with the status of the configuration ultimately being reported back to the requestor. Certain embodiments may employ self-healing to correct errors revealed by the testing. Particular embodiments may utilize Natural Language Processing (NLP) and/or predictive Machine Learning (ML) in order to perform one or more of the import, configuration, test, and/or (optional) self-healing functions. The predictive Machine Learning may be used to provide an estimated time of completion of the configuration based on past data and configurations.

The following detailed description and accompanying drawings provide a better understanding of the nature and advantages of various embodiments.

DETAILED DESCRIPTION

Described herein are methods and apparatuses that implement process setup and configuration. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
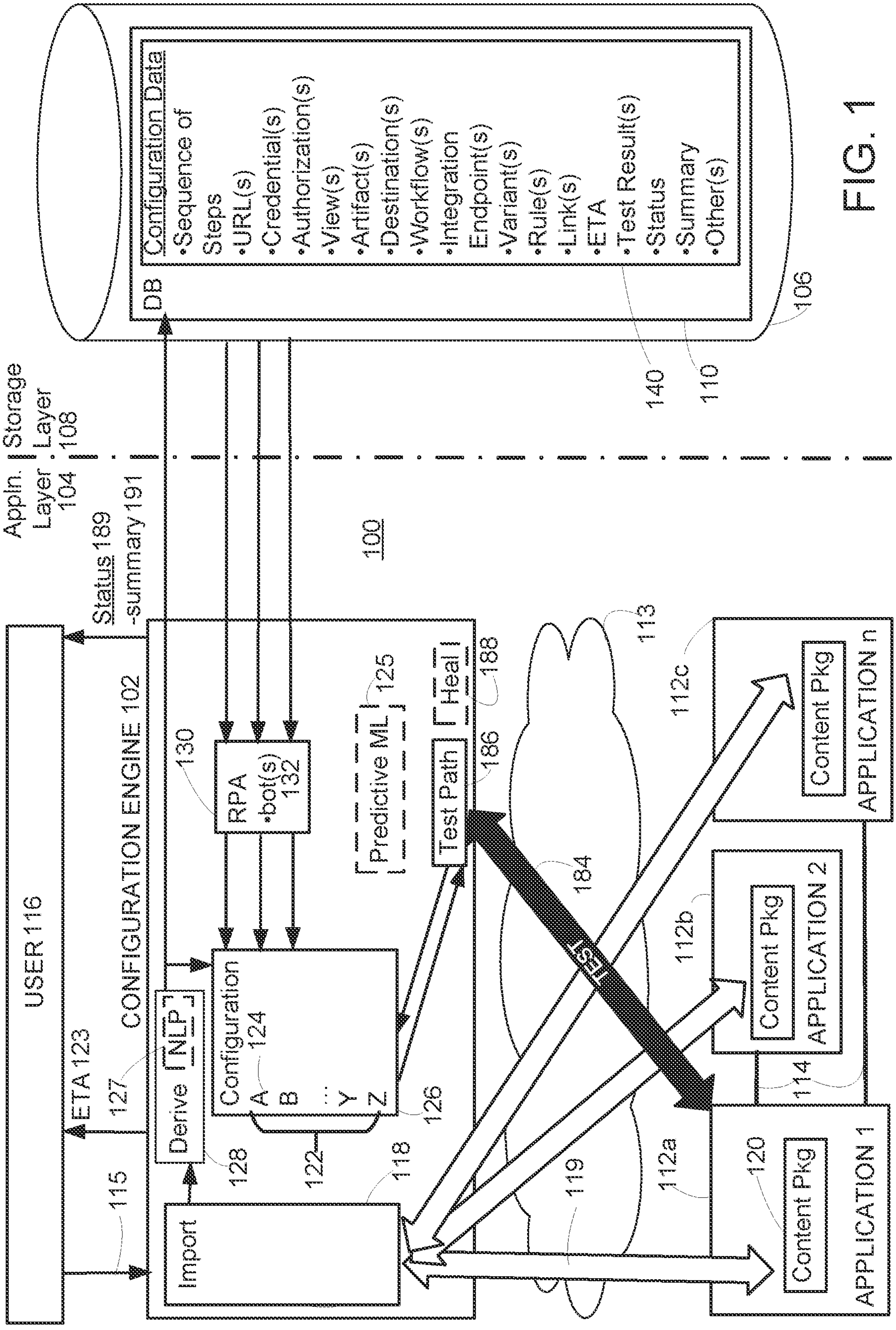
FIG. 1 shows a simplified diagram of a system according to an embodiment.

FIG. 1 shows a simplified view of an example system that is configured to implement process setup and configuration according to an embodiment. Specifically, system 100 comprises configuration engine 102 that is located in application layer 104.

The configuration engine is in communication with a non-transitory computer readable storage medium 106 that is located in a storage layer 108. The non-transitory computer readable storage medium includes a database 110.

Applications 112*a*, 112*b*, and 112*c* are also located in the application layer. These applications may be accessed by the configuration engine via network 113.

Application 112*a* is sought to be configured according to embodiments. Application 112*a* is connected to Application 112*b* and 112*c* via links 114. Thus, those other applications are also implicated in the set up of application 112*a*.

Accordingly, the configuration engine receives a configuration request 115 from user 116. In response, the configuration engine performs an import 118.

According to the import, materials relevant to setting up application(s) are read from respective content packages 120. The content from such materials can include but is not limited to URLs, credentials, and authorizations.

In one possible example relating to technology available from SAP SE of Walldorf Germany (and described more fully below), the content packages may include application documentation in the form of one or more of the following different types of guides:

- Setup Guide,
- Configuration Guide,
- Integration Guide,
- Core Data Service (CDS) View Guide. CDS views are present in a layer overlying the database and define semantically-enriched models.

From the imported content, the sequence 122 of steps 124 of a relevant configuration 126 are derived 128. This derivation of content data may be achieved with the help of Natural Language Processing (NLP) 127, which can interpret the content and generate therefrom a sequence of steps of the configuration relevant to the application.

The sequence of steps of the configuration is stored in the database, together with other types of configuration data 140 derived from the imported content. As is described further below in connection with FIGS. 3-7, examples of such configuration data can include but are not limited to:

- URL(s)
- Credential(s)
- Authorization(s)
- View(s)
- Artifact(s)
- Destination(s)
- Integration Endpoint(s)

Variant(s)
Rule(s)
Link(s)
ETA
Test Results
Status
Summary
Other(s)

Upon import of content and derivation of the sequence of steps of the configuration, the engine may return to the user, an estimated time of completion (ETA) 123 of the configuration. In some embodiments, this ETA may be calculated utilizing a Machine Learning capability 125 trained with past configuration events.

Following import of content and derivation of the sequence of steps of the configuration, Robotic Process Automation (RPA) 130 is employed to perform the sequence of steps of the configuration. One or more RPA bots 132 are created and interact with the configuration data.

Correlation between a RPA bot and relevant configuration information may be 1:1 for application-specialized interactions. For more generalized interactions (e.g., subscription) the bot:application correlation may be 1:n.

The configuration 126 is performed according to a sequence 122 of steps 124, which includes a first, starting end A, intermediate portions B-Y, and a second, concluding end Z. Configuration data within the database is used to complete the setup process from end-to-end.

Following the import and completion of the sequence of steps of the configuration, the engine may perform testing 184 of a test path 186 with sample data. A successful (happy) test path may extend from end-to-end, but does not necessarily include every possible feature available in the application.

It is noted that under some circumstances, the automated test path may fail the testing. Thus, the configuration engine may optionally include a self-healing capability 188. This self-healing can be referenced to identify and correct errors in the configuration 126.

FIG. 1 shows the configuration engine notifying the user of the status 189 of the configuration. Such notification may include a detailed summary 191 setting forth, for example, the different applications implicated and corresponding relevant configuration data.

It is noted that the configuration engine may optionally avail itself of machine learning (ML) capabilities 125 in order to perform one or more of the above functions. For example, ML could be used to predict the ETA and configuration process steps along with inputs (if any) for each configuration step. ML may also be used as part of configuration (e.g., to identify bots for a configuration step), testing, and/or optional self-healing.

According to some embodiments ML can provide a list of inputs for configuration steps. These inputs can be taken from steps of a previous configuration or from a user.

In some embodiments, ML can be used to identify bots to be used, based upon the determined configuration steps. And, for each configuration step there could be certain measures that may beneficially be taken for healing based on previous data. Similarly, the testing also can include automation corrections during runtime using ML.

It is further noted that the configuration engine may also optionally avail itself of Natural Language Processing (NLP) capabilities in order to perform one or more of the above functions. For example, NLP could be used to read setup guidance/documentation 120 that is present in natural language form.

Figure 2:
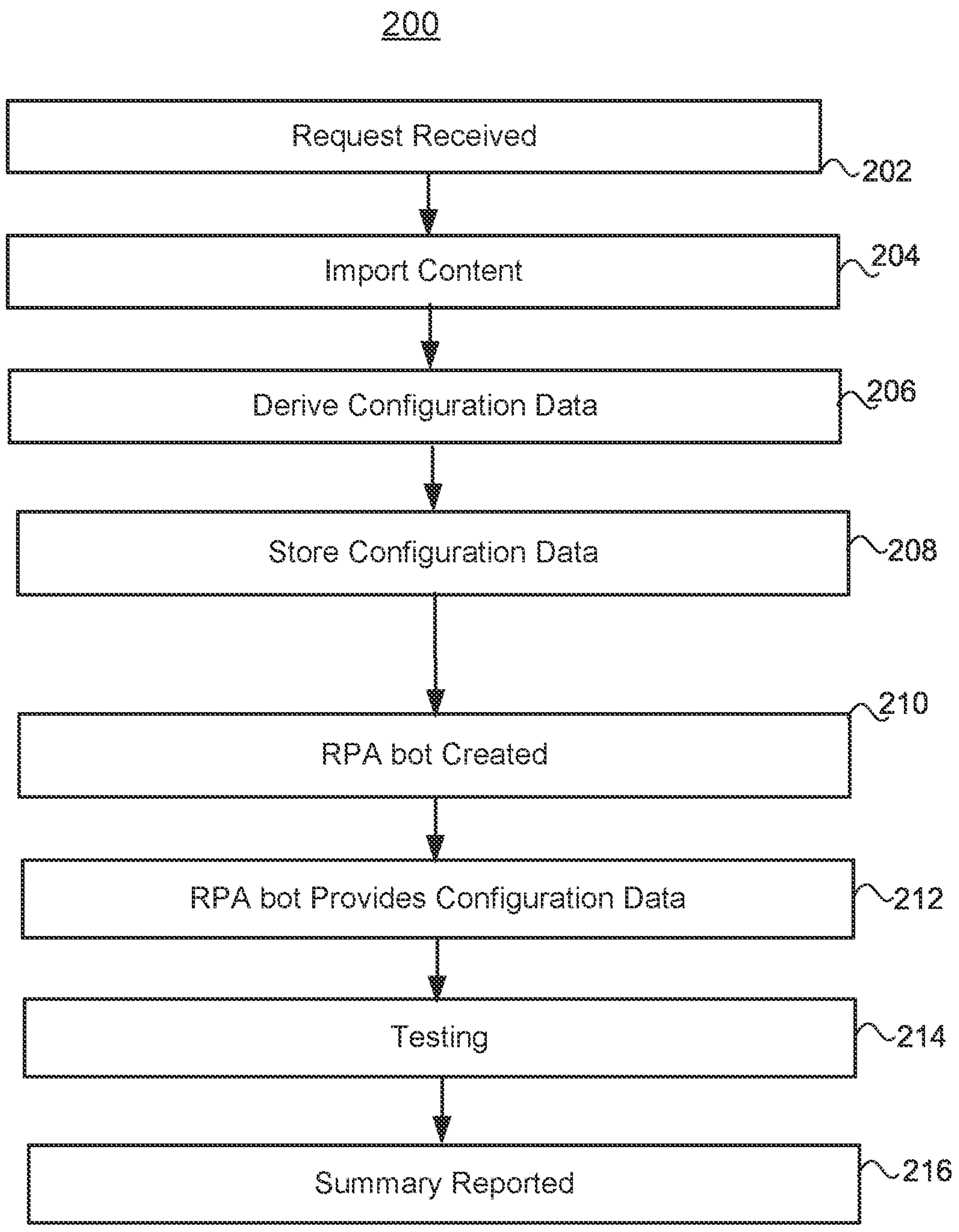
FIG. 2 shows a simplified flow diagram of a method according to an embodiment.

FIG. 2 is a flow diagram of a method 200 to set up an application according to an embodiment. At 202, a configuration request is received.

At 204, in response to the request, content of a content package of the software application is imported. At 206, configuration data including a sequence of steps is derived from the content.

At 208, the configuration data is stored in a non-transitory computer readable storage medium. At 210, for at least one of the sequence of steps a robotic process automation (RPA) bot is created from the configuration data.

At 212, the RPA bot provides at least part of the configuration data to the software application.

At 214, the sequence of steps is tested. At 216, a summary is reported to the user.

Further details regarding setting up an application according to various embodiments, are now provided in connection with the following example. In this particular example, process configuration and setup is implemented with the SAP One Market Place framework that is available from SAP SE of Walldorf, Germany.

Example

Figure 3:
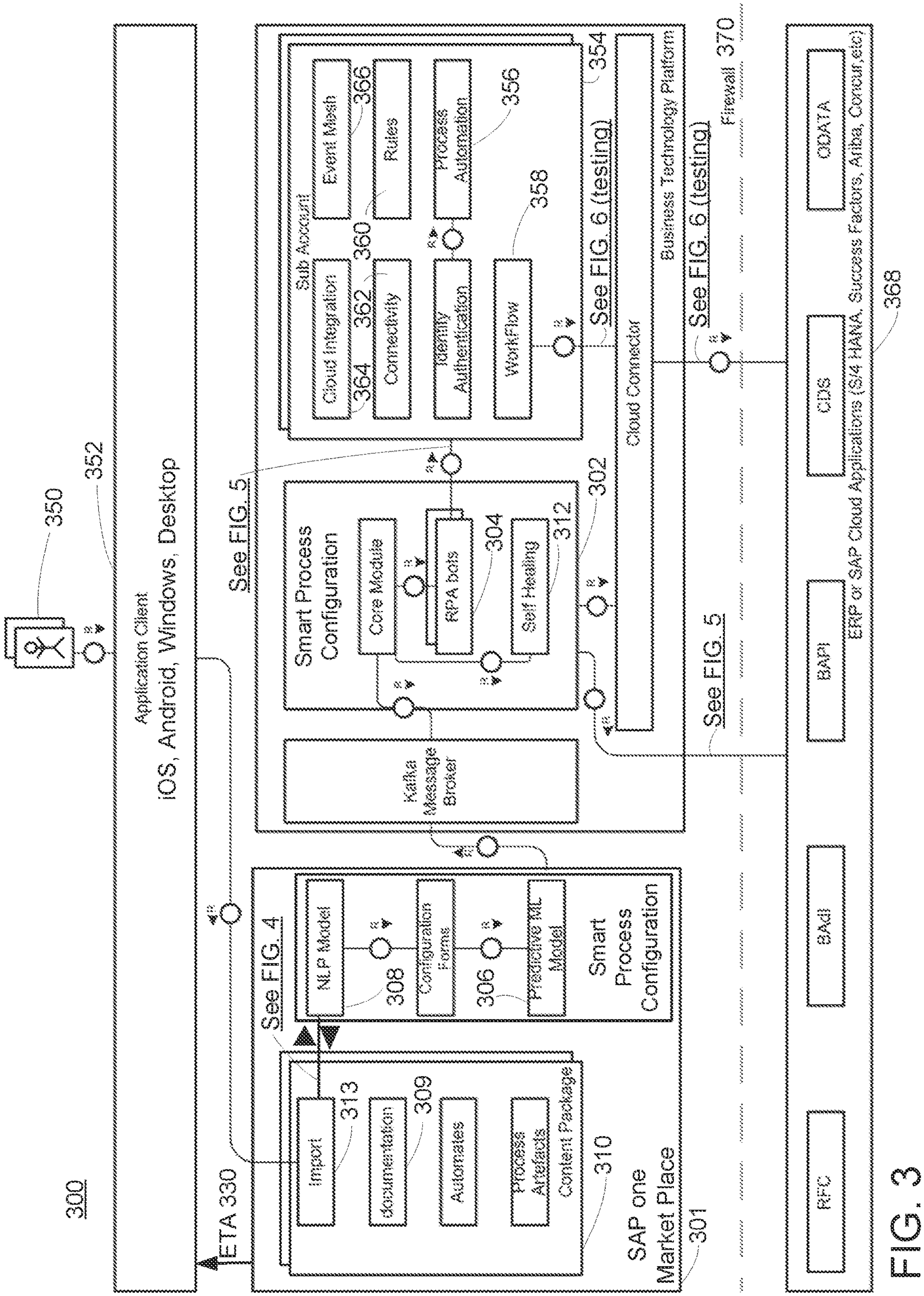
FIG. 3 shows an example of a system implementing process configuration and setup according to an embodiment.

FIG. 3 shows a simplified architecture 300 of the example, including the SAP One Market place 301. The SAP one marketplace is accessed by a user 350 via an application client 352.

The smart process configuration 302 of this example allows optimization and automation of the setup and configuration of a business process using Robotic Process Automation (RPA) 304, predictive Machine Learning (ML) 306, and Natural Language Processing (NLP) 308.

This example embodiment can read the setup and configuration documentation 309 centrally located in the SAP One Market place in order to identify the various systems and services that are implicated for available content package(s). This exemplary embodiment can then perform the configurations required in each of those systems based upon the relevant content package.

Finally, the embodiment can also run the end-to-end process with sample data in a test path in order to identify issues. Optionally, embodiments may automatically correct errors relating to configuration through self-healing 312. The initiator of the configuration receives a notification with a detailed execution summary.

Figure 4:
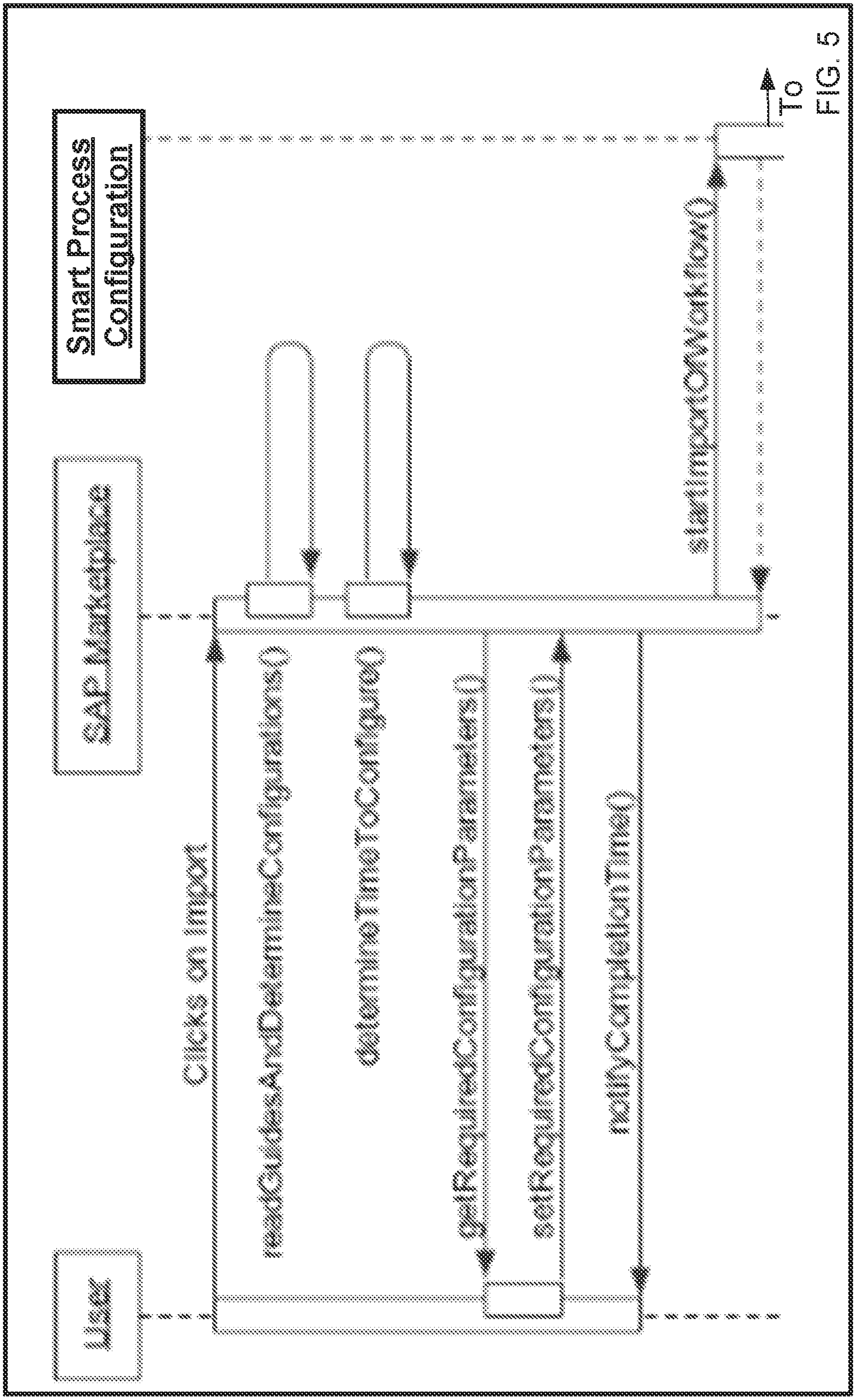
FIGS. 4-6 show process flows according to the example.

FIG. 4 is a detailed flow diagram showing interaction of a user with SAP One Market place 301 to perform import 313 of a content package 310.

A predictive ML model 306 determines an expected time for completion of import, configuration, and test path execution. After successful import, when the configuration steps are determined and inputs are provided by user, an estimated amount of time to complete the configurations and test run is calculated based on past data. This is estimated time of arrival (ETA) 330 is sent to user as information.

During import, using NLP the required documents/guides are read. Only necessary parameters for configurations are prompted to the user for input. The smart process configuration can automatically read the details of logged-in user for any configurations and notifications.

Figure 5:
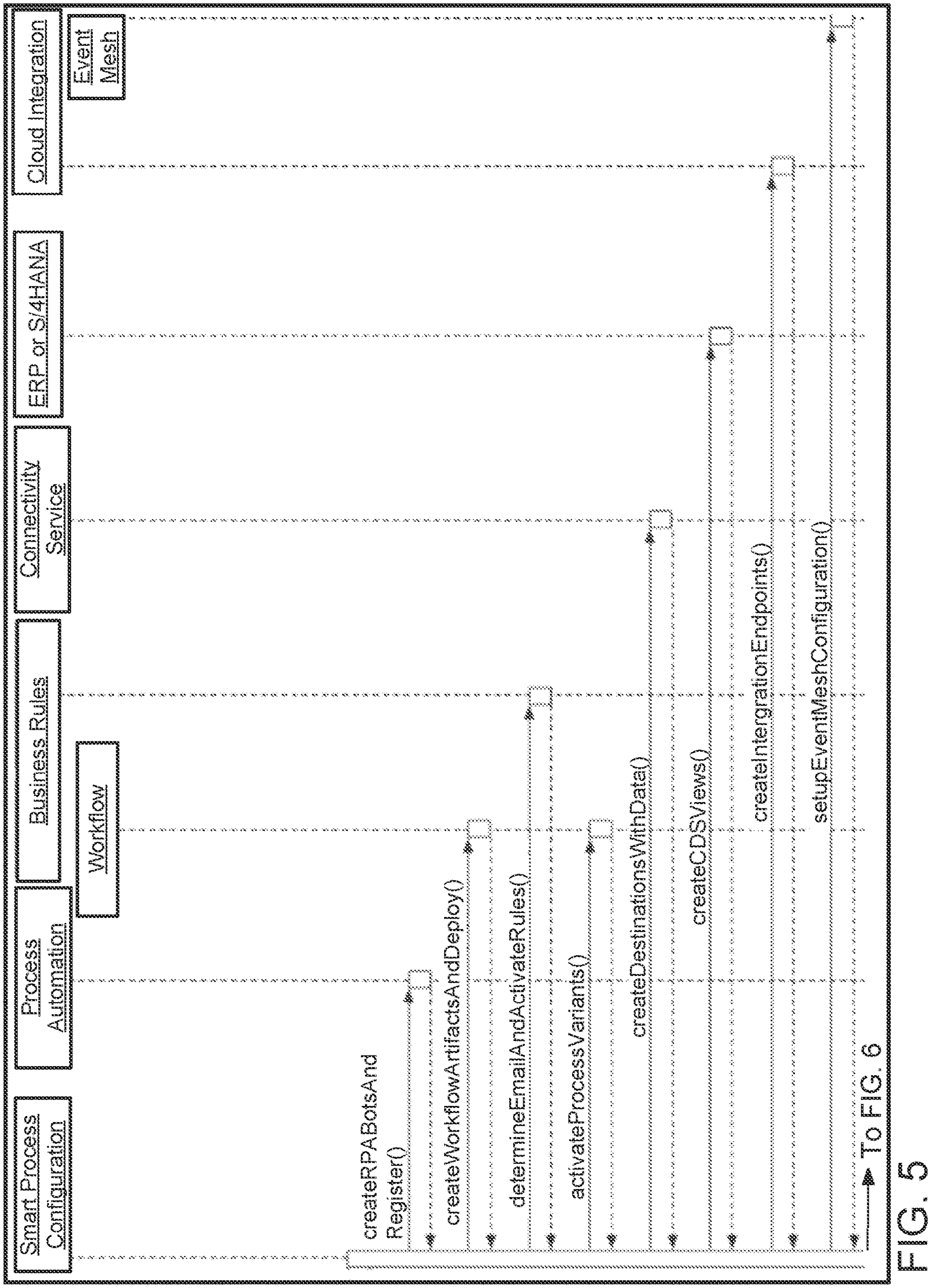

FIG. 5 shows details of interaction (using robotic process automation) between the sequence of steps of the configuration and elements of the Sub Account 354 of FIG. 3, which includes:

Process Automation 356;
Workflow 358;

Rules 360;
Connectivity 362;
Cloud Integration 364; and
Event Mesh 366.

FIG. 5 further shows interaction occurring as well with Enterprise Resource Planning (ERP) or SAP S/4HANA 368. This interaction may take place across firewall 370.

The flow of FIG. 5 shows that using RPA bots, artifacts such as UI5 applications, visibility scenarios, and process variants are activated.

Using RPA bots, Core Data Services (CDS) views are automatically configured for communication. Also, using RPA bots, related artifacts like systems and users are automatically configured for communication. Such utilization of RPA bots configures integration between the different systems and allows implementation of an event-driven architecture.

Figure 6:
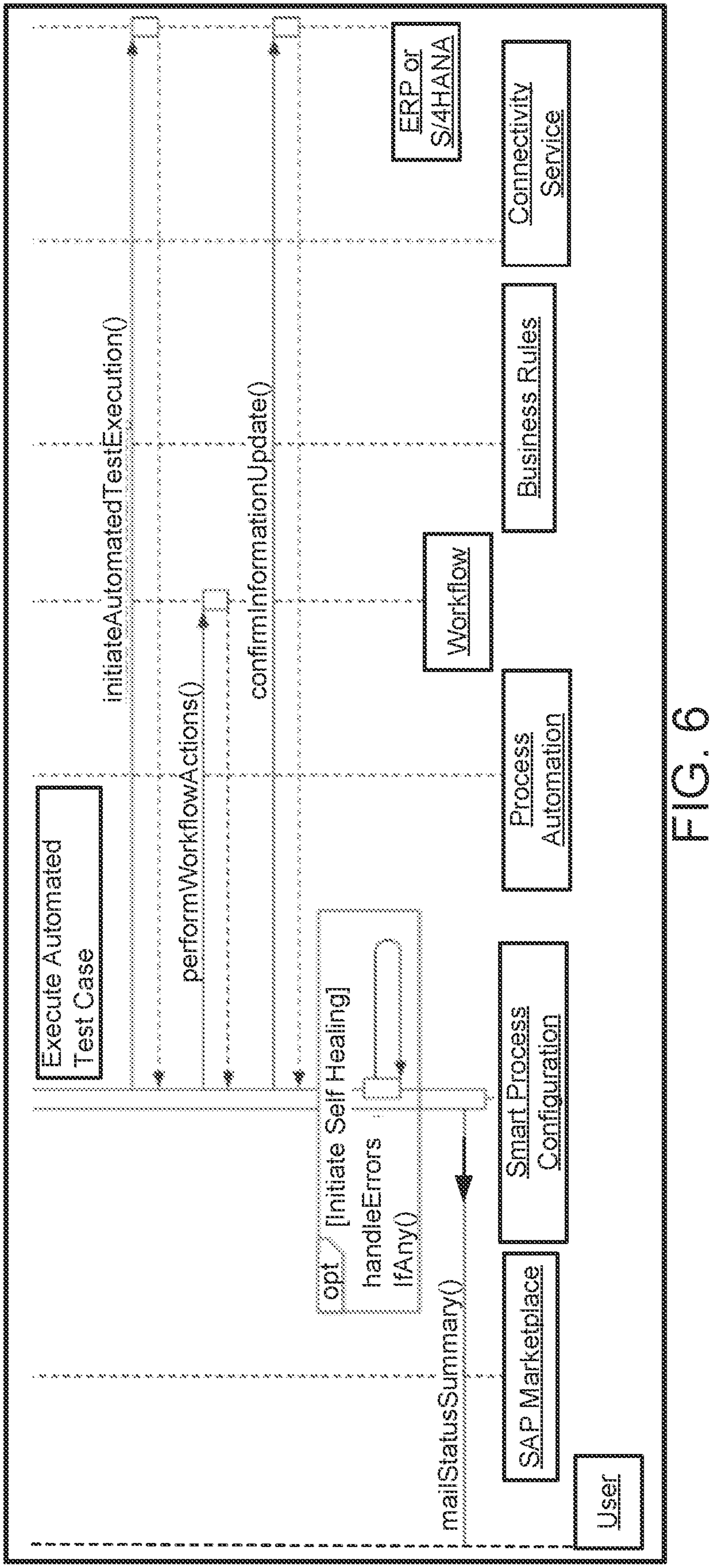

FIG. 6 shows the execution of an automated test case in UI mode or (optional) NON-UI mode with sample data. A successful test path may extend from end-to-end, but does not necessarily include every possible available feature.

UI Mode will run the test with the browser opened either visible or in background. In UI Mode, executions can happen in the background without user intervention.

NON-UI mode will execute the test only by testing the Application Programming Interface (API) calls. The NON-UI mode may be desired owing to its faster speed of operation.

If the setup or configuration or automated test path fails, FIG. 6 further shows that self-healing may be initiated. Such self-healing comprises a useful (but optional) feature.

FIG. 6 concludes with the smart process configuration notifying (e.g., via mail) the user once the process is completed. The notification may include a summary comprising details of one or more of:

configuration steps,
test case executed,
time for test case execution
status of test case execution (e.g., Passed, Failed, Retry).

Thus during import, embodiments allow reading of relevant guide(s) from the content package and determining therefrom sequence of steps of configurations and properties/parameters that may be required. Embodiments may present required fields (e.g., URL, credentials key, others) in a simple UI to the user. Based upon this provided data, embodiments may create the configuration in the different applications using RPA bots.

Process configuration and setup that is implemented according to embodiments, may offer one or more benefits. Specifically, one possible benefit is ease of use. That is, end users can experience hassle-free import and configuration of Workflow Management Packages without having to manually access various specialized systems such as Business Technology Platform (BTP), integration, workflow platform, ERP system, and others.

Another possible benefit conferred by embodiments is foresight. That is, embodiments allow predictive analysis to estimate the ETA for implementing the process, taking into account various parameters and notifying the end-user.

Still another possible advantage is speed of use. That is, robotic process automation bots can perform the configuration tasks in parallel, thereby reducing the time for implementation and reducing human errors.

Embodiments may also offer flexibility and resilience. That is, an adaptive crowd-sourced machine learning procedure can exhibit self-healing capabilities during setup and configuration phases.

Embodiments may further exhibit transparency. For example, users can receive the notification (e.g., by mail) of the result of a successful path for workflow after the import, without needing to separately log in to systems.

Embodiments may offer significant cost savings. In one example, implementation time and cost could be reduced from twenty-one person days (about three weeks) to less than one hour. In an environment where four hundred package imports are being performed per month, this amounts to a savings of 100,000 person days of effort.

Still another possible benefit is adaptability. In particular, reliance upon NLP allows backwards compatibility for business processes that are already released and available on SAP one Market Place.

Returning now to FIG. 1, there the particular embodiment is depicted with the configuration engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above.

Figure 7:
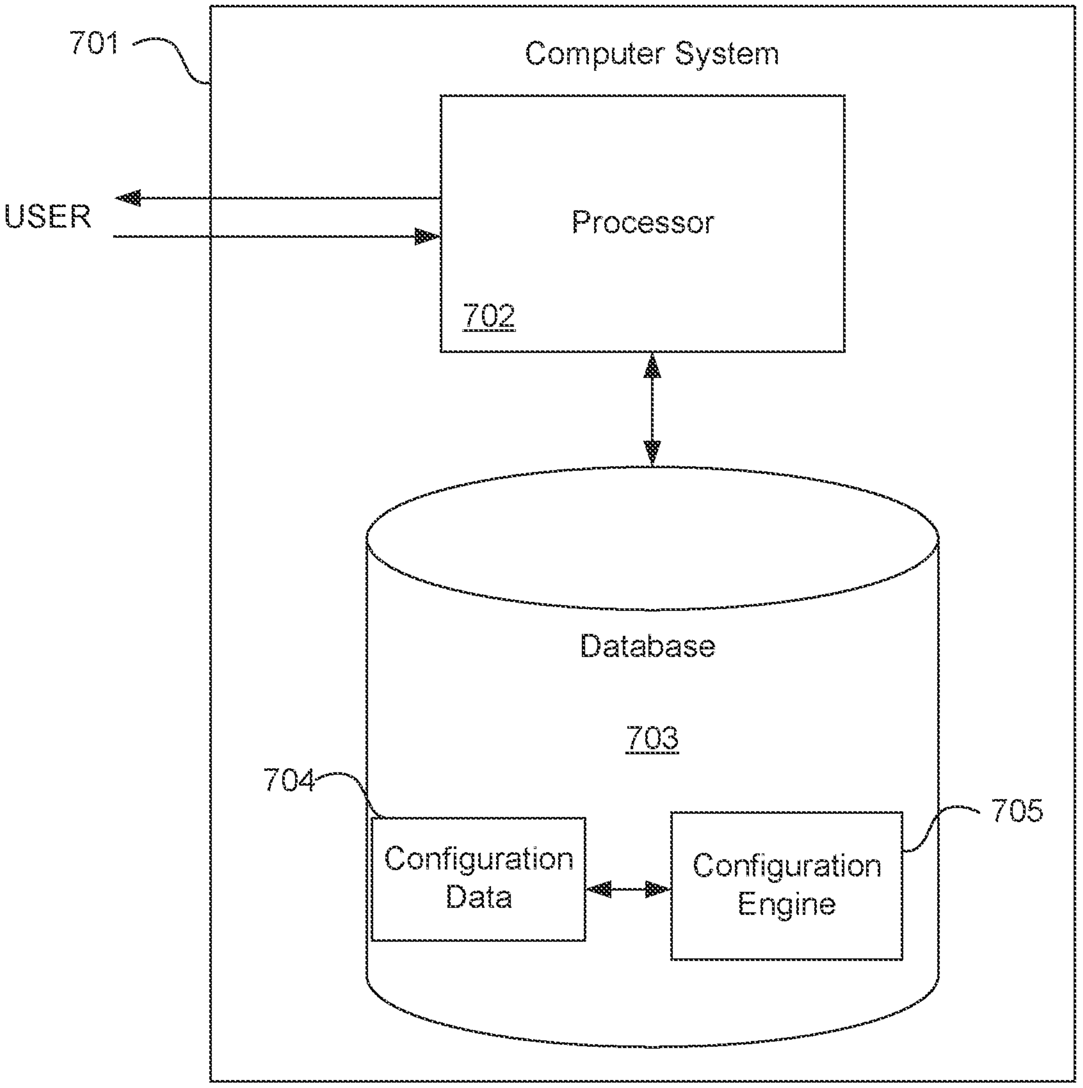
FIG. 7 illustrates hardware of a special purpose computing machine configured to implement process setup according to an embodiment.

Thus FIG. 7 illustrates hardware of a special purpose computing machine configured to perform process configuration and setup according to an embodiment. In particular, computer system 701 comprises a processor 702 that is in electronic communication with a non-transitory computer-readable storage medium comprising a database 703. This computer-readable storage medium has stored thereon code 705 corresponding to a configuration engine. Code 704 corresponds to configuration data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods for setting up a software application for use, comprising:

receiving, from a user, a request to configure the software application;
in response to the request, importing a content package of the software application;
deriving configuration data from the content package, the configuration data including a sequence of steps having a first end and a second end;
storing the configuration data in a non-transitory computer readable storage medium;
creating, for at least one of the sequence of steps, a robotic process automation (RPA) bot from the configuration data;
using the RPA bot to provide at least part of the configuration data to the software application in the at least one of the sequence of steps;
testing the sequence of steps according to a path including the first end and the second end;
reporting to the user, a summary including a status of the testing.

Example 2. The computer implemented system or method of Example 1 wherein configuration data is derived from the content package using Natural Language Processing (NLP).

Example 3. The computer implemented system or method of Examples 1 or 2 wherein the sequence of steps is derived from the content package using Machine Learning (ML).

Example 4. The computer implemented system or method of Example 3. A method as in claim 3 wherein the ML is trained by a previous sequence of steps.

Example 5. The computer implemented system or method of Example 4 wherein: the testing reveals an error with the one of the sequence of steps, the previous sequence of steps includes the error; and the method further comprises referencing the ML to heal the error.

Example 6. The computer implemented system or method of Examples 4 or 5 further comprising:

calculating an estimated time of completing the sequence of steps; and prior to reporting the summary, returning the estimated time to the user.

Example 7. The computer implemented system or method of Example 6 wherein the estimated time is calculated from a completion time of the previous sequence of steps.

Example 8. The computer implemented system or method of Examples 1, 2, 3, 4, 5, 6, or 7 wherein the testing is of an Application Programming Interface (API) call.

Example 9. The computer implemented system or method of Examples 1, 2, 3, 4, 5, 6, 7, or 8 wherein:

the non-transitory computer readable storage medium comprises an in-memory database; and at least one of the deriving and the testing is performed by an in-memory database engine of the in-memory database.

Figure 8:
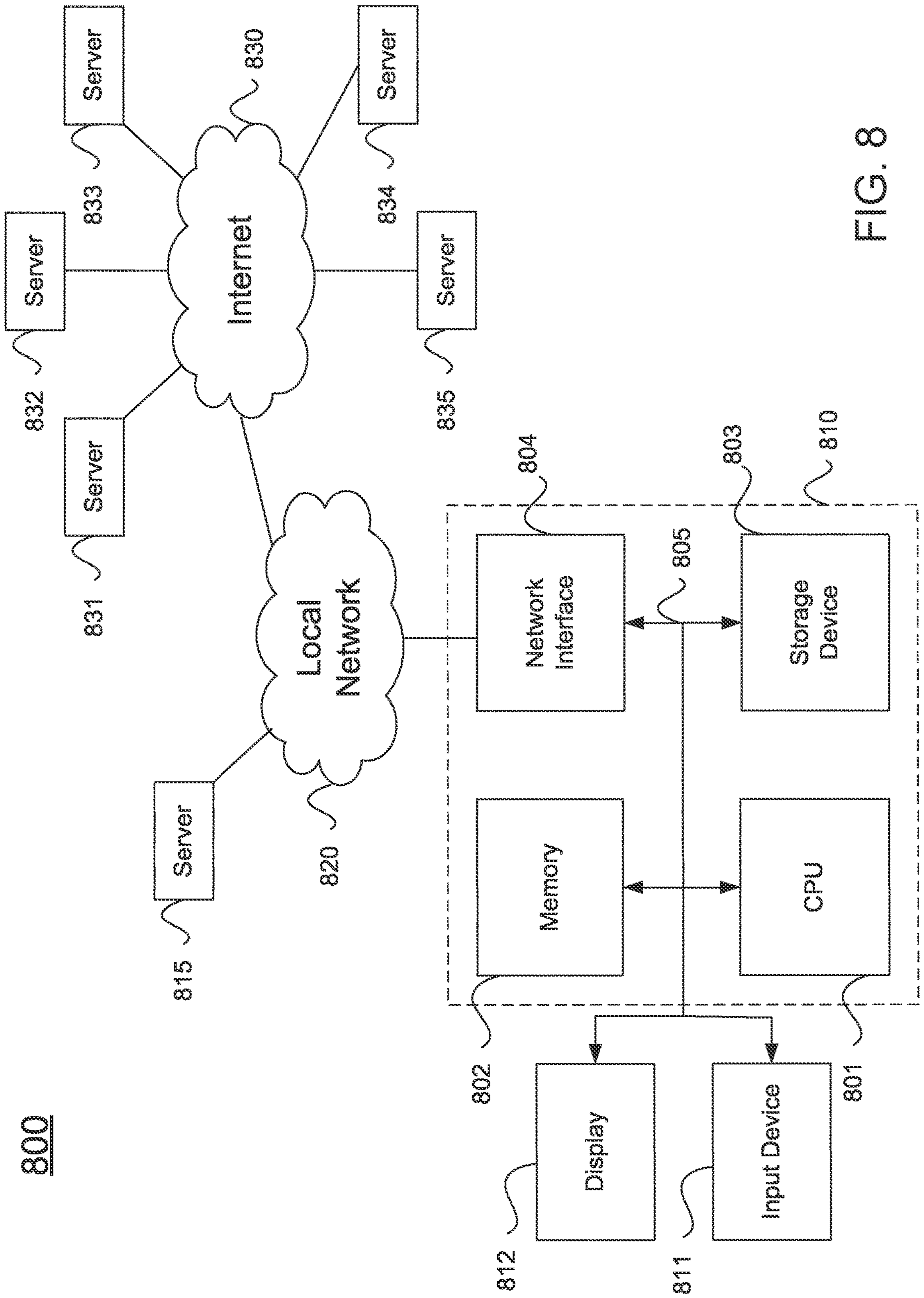
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a Light Emitting Diode (LED) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein.

One example of a cloud computing network includes the Internet. The internet provides a connection between multiple servers. The Internet and the servers together build a network.

Software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for setting up a software application for use, the method comprising:

receiving, from a user, a request to configure the software application;

in response to the request, importing a content package of the software application;

deriving, using a machine learning (ML) model, configuration data from the content package, the configuration data including:

a sequence of steps having a first end and a second end, and an estimated time of completion of the sequence of steps;

receiving one or more user inputs based on the configuration data;

storing the configuration data and the one or more user inputs in a non-transitory computer readable storage medium;

creating, for at least one of the sequence of steps, a robotic process automation (RPA) bot from the configuration data and the one or more user inputs;

using the RPA bot to provide at least part of the configuration data to the software application in the at least one of the sequence of steps;

testing the sequence of steps according to a path including the first end and the second end; and reporting to the user, a summary including a status of the testing, wherein the testing reveals an error with the at least one of the sequence of steps, and wherein a previous sequence of steps includes the error; and referencing the ML model to heal the error.

2. A method as in claim 1 wherein configuration data is derived from the content package using Natural Language Processing (NLP).

3. A method as in claim 1 wherein the testing is of an Application Programming Interface (API) call.

4. A method as in claim 1 wherein:

the non-transitory computer readable storage medium comprises an in-memory database;

and at least one of the deriving and the testing is performed by an in-memory database engine of the in-memory database.

5. The method of claim 1, wherein the ML model is trained by the previous sequence of steps.

6. The method of claim 1, wherein the configuration data further comprises a uniform resource locator (URL) and a credential.

7. The method of claim 1, wherein the method further comprises providing the configuration data in a user interface to receive the one or more user inputs.

8. The method of claim 1, further comprising:

using an NLP model to read parameters of the configuration data from documents; and providing the configuration data and the read parameters in a user interface to receive the one or more user inputs.

9. A non-transitory computer readable storage medium embodying a computer program for performing a method for setting up a software application for use, said method comprising:

receiving, from a user, a request to configure the software application;

in response to the request, importing a content package of the software application;

deriving, using an ML model, configuration data from the content package, the configuration data including:

a sequence of steps having a first end and a second end, and an estimated time of completion of the sequence of steps;

receiving one or more user inputs based on the configuration data;

storing the configuration data and the one or more user inputs in a non-transitory computer readable storage medium;

creating, for at least one of the sequence of steps, a robotic process automation (RPA) bot from the configuration data and the one or more user inputs;

using the RPA bot to provide at least part of the configuration data to the software application in the at least one of the sequence of steps;

testing the sequence of steps according to a path including the first end and the second end; and reporting to the user, a summary including a status of the testing, wherein the testing reveals an error with the at least one of the sequence of steps, and wherein a previous sequence of steps includes the error; and referencing the ML model to heal the error.

10. A non-transitory computer readable storage medium as in claim 9 wherein the ML is trained by the previous sequence of steps.

11. A non-transitory computer readable storage medium as in claim 9, wherein the configuration data further comprises a uniform resource locator (URL) and a credential.

12. A non-transitory computer readable storage medium as in claim 9, wherein the method further comprises providing the configuration data in a user interface to receive the one or more user inputs.

13. A non-transitory computer readable storage medium as in claim 9, wherein the method further comprises:

using an NLP model to read parameters of the configuration data from documents; and providing the configuration data and the read parameters in a user interface to receive the one or more user inputs.

14. A computer system comprising:

one or more processors;

a software program, executable on said computer system, the software program configured to cause an in-memory database engine of an in-memory database to perform a method comprising:

receiving, from a user, a request to configure a software application;

in response to the request, importing a content package of the software application;

deriving, using an ML model, configuration data from the content package, the configuration data including:

a sequence of steps having a first end and a second end, and an estimated time of completion of the sequence of steps;

receiving one or more user inputs based on the configuration data;

storing the configuration data and the one or more user inputs in a non-transitory computer readable storage medium;

creating, for at least one of the sequence of steps, a robotic process automation (RPA) bot from the configuration data and the one or more user inputs;

using the RPA bot to provide at least part of the configuration data to the software application in the at least one of the sequence of steps;

testing the sequence of steps according to a path including the first end and the second end; and reporting to the user, a summary including a status of the testing, wherein the testing reveals an error with the at least one of the sequence of steps, and wherein a previous sequence of steps includes the error; and referencing the ML model to heal the error.

15. A computer system as in claim 14 wherein the in-memory database engine is configured to use Natural Language Processing (NLP) to derive the configuration data.

16. A computer system as in claim 14 wherein the in-memory database engine is further configured to:

calculate an estimated time of completing the sequence of steps from a completion time of the previous sequence of steps; and prior to reporting the summary, return the estimated time to the user.

17. A computer system as in claim 14 wherein the in-memory database engine is configured to test the sequence of steps using an Application Programming Interface (API) call.

18. A computer system as in claim 14, wherein the configuration data further comprises a uniform resource locator (URL) and a credential, and wherein the method further comprises providing the configuration data in a user interface to receive the one or more user inputs.

19. A computer system as in claim 14, wherein the method further comprises:

using an NLP model to read parameters of the configuration data from documents; and providing the configuration data and the read parameters in a user interface to receive the one or more user inputs.

20. A computer system as in claim 14, wherein the ML model is trained by the previous sequence of steps.

* * * * *